(12) United States Patent
Tadokoro

(10) Patent No.: US 11,422,937 B2
(45) Date of Patent: Aug. 23, 2022

(54) MULTIPROCESSOR SYSTEM AND METHOD FOR CONTROLLING SHARED MEMORY

(71) Applicant: KIOXIA CORPORATION, Minato-ku (JP)

(72) Inventor: Mitsunori Tadokoro, Fujisawa (JP)

(73) Assignee: KIOXIA CORPORATION, Minato-ku (JP)

( * ) Notice: Subject to any disclaimer, the term of this patent is extended or adjusted under 35 U.S.C. 154(b) by 0 days.

(21) Appl. No.: 16/550,365

(22) Filed: Aug. 26, 2019

(65) Prior Publication Data

US 2020/0301834 A1 Sep. 24, 2020

(30) Foreign Application Priority Data

Mar. 20, 2019 (JP) .............................. JP2019-053337

(51) Int. Cl.
*G06F 12/00* (2006.01)
*G06F 12/084* (2016.01)

(52) U.S. Cl.
CPC .... *G06F 12/084* (2013.01); *G06F 2212/1041* (2013.01)

(58) Field of Classification Search
CPC ....................... G06F 12/084; G06F 2212/1041
See application file for complete search history.

(56) References Cited

U.S. PATENT DOCUMENTS

| 5,581,705 | A  | * | 12/1996 | Passint | ............ | G06F 15/17381 |
| | | | | | | 709/200 |
| 6,170,003 | B1 | * | 1/2001 | Benkual | ................. | H04L 29/06 |
| | | | | | | 709/214 |
| 2003/0005263 | A1 | * | 1/2003 | Eickemeyer | .......... | G06F 9/3851 |
| | | | | | | 712/218 |
| 2006/0236011 | A1 | * | 10/2006 | Narad | ...................... | G06F 5/10 |
| | | | | | | 710/240 |
| 2009/0043927 | A1 | * | 2/2009 | Inoue | ........................ | G06F 5/10 |
| | | | | | | 710/54 |
| 2013/0086183 | A1 | | 4/2013 | Frank et al. | | |
| 2014/0149694 | A1 | * | 5/2014 | Lee | ........................... | G06F 5/12 |
| | | | | | | 711/159 |

(Continued)

FOREIGN PATENT DOCUMENTS

JP 06-149703 A 5/1994
JP 6238898 B2 11/2017

*Primary Examiner* — Arvind Talukdar
(74) *Attorney, Agent, or Firm* — Oblon, McClelland, Maier & Neustadt, L.L.P.

(57) ABSTRACT

A multiprocessor system includes a shared memory, and first and second processors. The shared memory includes a queue configured to store messages. The first processor transmits the messages to the shared memory. The second processor receives the messages stored in the shared memory. The first memory stores a first head pointer indicating a vacant position head of the queue and a first tail pointer indicating a vacant position tail of the queue. The second memory stores a second head pointer indicating a position of a head of the messages stored in the queue and a second tail pointer indicating a tail position of the messages stored in the queue. The first processor increments the first head pointer and copies a value identical to a value of the first head pointer to the second tail pointer, when transmitting the messages.

16 Claims, 3 Drawing Sheets

(56) References Cited

U.S. PATENT DOCUMENTS

2015/0193366 A1* 7/2015 Blocksome ............. G06F 13/30
710/28
2018/0081574 A1 3/2018 Nagatani et al.
2020/0301765 A1* 9/2020 Vary ................ G08B 13/19676

* cited by examiner

MULTIPROCESSOR SYSTEM AND METHOD FOR CONTROLLING SHARED MEMORY

CROSS-REFERENCE TO RELATED APPLICATIONS

This application is based upon and claims the benefit of priority from the Japanese Patent Application No. 2019-053337, filed Mar. 20, 2019, the entire contents of which are incorporated herein by reference.

FIELD

Embodiments described herein relate generally to a multiprocessor system and a method for controlling a shared memory.

BACKGROUND

Multiprocessor systems have been known to be capable of parallel processing or the like by individual processors through sharing a single memory using two or more processors. In such multiprocessor systems, each of the processors determines, depending on a vacancy status of the message queue, whether or not messages can be transmitted or received.

DETAILED DESCRIPTION

In general, according to one embodiment, a multiprocessor system includes a shared memory, and first and second processors. The shared memory includes a queue configured to store messages. The first processor transmits the messages to the shared memory. The second processor receives the messages stored in the shared memory. The first memory stores a first head pointer indicating a vacant position head of the queue and a first tail pointer indicating a vacant position tail of the queue. The second memory stores a second head pointer indicating a position of a head of the messages stored in the queue and a second tail pointer indicating a tail position of the messages stored in the queue. The first processor increments the first head pointer and copies a value identical to a value of the first head pointer to the second tail pointer, when transmitting the messages.

Hereinafter, embodiments will be described with reference to the drawings.

[1] Configuration of the Multiprocessor System

Figure 1:
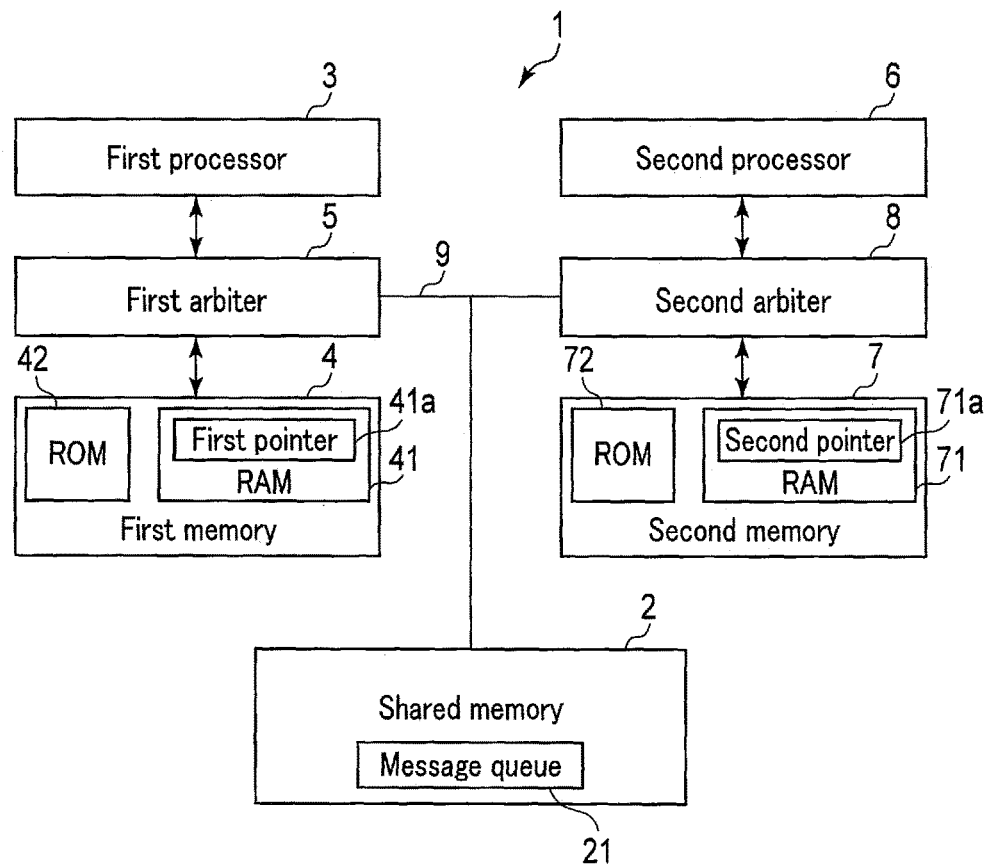
FIG. 1 is a view showing an overall configuration example of a multiprocessor system according to an embodiment.

FIG. 1 is a view showing an overall configuration example of a multiprocessor system according to an embodiment. A multiprocessor system 1 includes a shared memory 2, a first processor 3, a first memory 4, a first arbiter 5, a second processor 6, a second memory 7, and a second arbiter 8.

The shared memory 2 is a memory shared by the first processor 3 and the second processor 6. The shared memory 2 is a global memory provided at a location global to both the first processor 3 and the second processor 6. For example, the shared memory 2 is provided to be accessed from the first processor 3 and the second processor 6 via a master bus 9 or the like. The shared memory 2 is, for example, a Random Access Memory (RAM). The shared memory 2 is used, for example, as a working memory for parallel processing of the first processor 3 and the second processor 6. The shared memory 2 is not limited to the RAM. The shared memory 2 includes a message queue 21. The message queue 21 is a First-In First-Out (FIFO) ring buffer. The message queue 21 stores messages. The messages stored in the message queue 21 are stored until they are retrieved by the processor on the receiving side. The messages include various information that can be exchanged between the first processor 3 and the second processor 6, such as control or data.

The first processor 3 is, for example, a Central Processing Unit (CPU). The first processor 3 uses the shared memory 2 to execute various data processes. Also, the first processor 3 stores the messages in the message queue 21 as needed.

The first memory 4 is a local memory provided at a location local to the first processor 3. For example, the first memory 4 is provided to be accessed from the first processor 3 without passing through the master bus 9 or the like. The first memory 4 is a low capacity memory that can be accessed faster than the shared memory 2. The first memory 4 may include a RAM 41 and a ROM 42.

The RAM 41 is a semiconductor memory device that can be written arbitrarily. The RAM 41 may store a first pointer 41a. The first pointer 41a is a pointer for transmitting messages. The first pointer 41a includes a first head pointer and a first tail pointer. The first head pointer is a pointer that indicates the head of the vacant positions in the message queue 21. The first tail pointer is a pointer that indicates the tail of the vacant positions in the message queue 21.

The ROM 42 is a read-only semiconductor memory device. The ROM 42 may store a program including firmware or the like for the operation by the first processor 3. When the first processor 3 receives a supply of power, the firmware stored in the ROM 42 is read-out to the RAM 41. The first processor 3 executes a predetermined process in accordance with the firmware. In addition, the first processor 3 implements various functions in accordance with various programs stored in the ROM 42. The various programs include various application software, an operating system, a file system, and the like.

The first arbiter 5 is a circuit provided between the first processor 3 and the first memory 4. The first arbiter 5 is also connected to the second arbiter 8 via the master bus 9. The first arbiter 5 arbitrates access to the first memory 4. For example, when the access to the first memory 4 by the first processor 3 and the second processor 6 competes, the first arbiter 5 gives, in a predetermined order, the right of use of the bus for accessing the first memory 4 to each of: the first processor 3 and the second processor 6.

The second processor 6 is, for example, a CPU. The second processor 6 uses the shared memory 2 to execute various data processes. The second processor 6 may or may not be a processor having the same configuration as the first processor 3. The second processor 6 uses the shared memory 2 to execute various data processes. In addition, the second processor 6 takes out the message stored in the message queue 21. Then, the second processor 6 executes a process in accordance with the extracted message.

The second memory 7 is a local memory provided at a location local to the second processor 6. For example, the second memory 7 is provided to be accessed from the second processor 6 without passing through the master bus 9 or the like. The second memory 7 is a low capacity memory that can be accessed faster than the shared memory 2. Similar to the first memory 4, the second memory 7 may include a RAM 71 and a ROM 72.

The RAM 71 is a semiconductor memory device that can be arbitrarily written. The RAM 71 may store a second pointer 71a. The second pointer 71a is a pointer for receiving the message. The second pointer 71a includes a second head pointer and a second tail pointer. The second head pointer is a pointer that indicates the head position of the message stored in the message queue 21. The second tail pointer is a pointer that indicates the tail position of the messages stored in the message queue 21.

The ROM 72 is a read-only semiconductor memory device. The ROM 72 may store a program including firmware or the like for the operation by the second processor 6. When the second processor 6 receives a supply of power, the firmware stored in the ROM 72 is read-out to the RAM 71. The second processor 6 executes a predetermined process in accordance with the firmware. In addition, the second processor 6 implements various functions in accordance with various programs stored in the ROM 72. The various programs include various application software, an operating system, a file system, and the like.

The second arbiter 8 is a circuit provided between the second processor 6 and the second memory 7. The second arbiter 8 is also connected to the first arbiter 5 via the master bus 9. The second arbiter 8 arbitrates access to the second memory 7. For example, when the access to the second memory 7 by the first processor 3 and the second processor 6 competes, the second arbiter 8 gives, in a predetermined order, the right of use of the bus for accessing the second memory 7 to each of: the first processor 3 and the second processor 6.

[2] Operation by the Multiprocessor System

Figure 2:
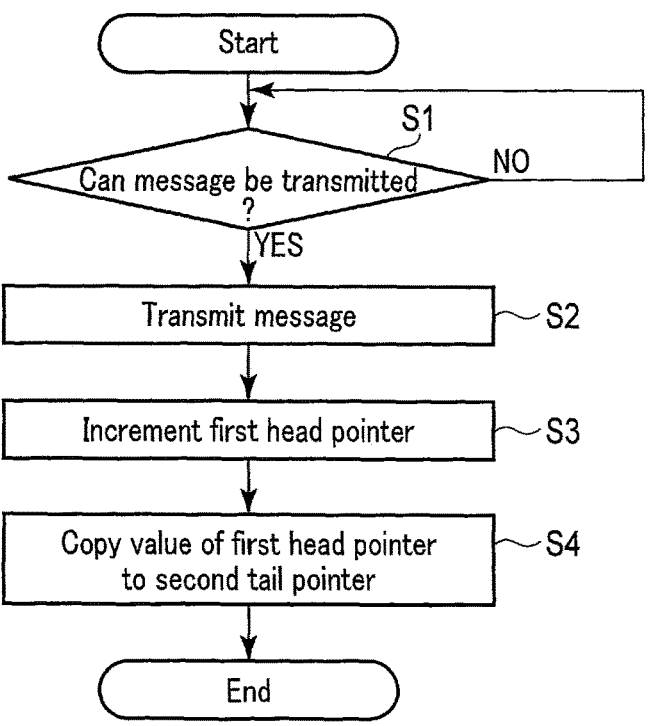
FIG. 2 is a flowchart showing a message transmission operation by a processor on the transmitting side in a multiprocessor system according to an embodiment.

First, the operation by a processor on the transmitting side will be described. FIG. 2 is a flowchart showing a message transmission operation by a processor on the transmitting side of the multiprocessor system according to an embodiment. Here, in the example of FIG. 1, the processor on the transmitting side is the first processor 3.

To transmit a message, the first processor 3 determines, in step S1, whether or not a message can be transmitted. The determination in step S1 is made according to whether the message queue 21 is full. If the message queue 21 is full, it is determined that the message cannot be transmitted. When it is determined in step S1 that a message cannot be transmitted (NO in S1), the determination in step S1 is continued. In other words, the process is held until it has been determined that a message can be transmitted. Other processes in combination with the determination in step S1 may be performed. If it is not determined after a predetermined time that the message can be transmitted, the process in FIG. 2 may be ended. When it is determined in step S1 that the message can be transmitted (S1 YES), the first processor 3 executes the process in step S2.

Figure 3A:
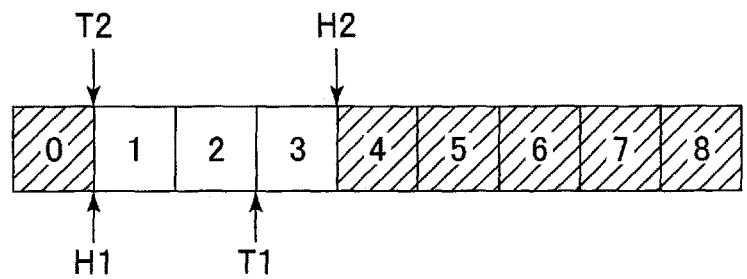
FIG. 3A is a view showing relationships between a first head pointer, a first tail pointer, a second head pointer, and a second tail pointer when a message queue is not full.
Figure 3B:
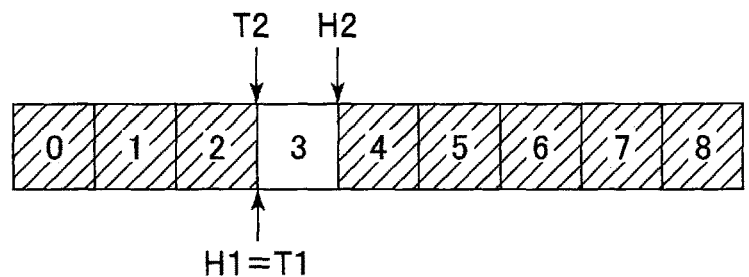
FIG. 3B is a view showing relationships between a first head pointer, a first tail pointer, a second head pointer, and a second tail pointer when a message queue is full.

Here, whether or not the message queue 21 is full is determined using the first pointer 41a. FIG. 3A is a view showing the relationships between a first head pointer H1, a first tail pointer T1, a second head pointer H2, and a second tail pointer T2 when the message queue 21 is not full. Further, FIG. 3B is a view showing the relationships between the first head pointer H1, the first tail pointer T1, the second head pointer H2, and the second tail pointer T2 when the message queue 21 is full. Here, it is assumed that messages are stored in the cross-hatched positions in FIGS. 3A and 3B. Further, in the example of FIGS. 3A and 3B, the queue depth of the message queue 21 is nine. That is, the message queue 21 is a nine-stage FIFO.

As described above, the first head pointer H1 indicates the head of the vacant positions. Also, the first tail pointer T1 indicates the tail of the vacant positions. In other words, the difference between the first head pointer H1 and the first tail pointer T1 indicates that the message queue 21 is vacant. Therefore, as shown in FIG. 3A, when the message queue 21 is vacant, the first head pointer H1 and the first tail pointer T1 do not coincide with each other. On the other hand, as shown in FIG. 3B, when the message queue 21 is full, the first head pointer H1 and the first tail pointer T1 coincide with each other.

In other words, in step S1, the first processor 3 determines whether or not a message can be transmitted by determining whether or not the first head pointer H1 and the first tail pointer T1 coincide with each other.

Back to the explanation of FIG. 2, in step S2, the first processor 3 transmits the message to the shared memory 2. The message is stored in the message queue 21 of the shared memory 2. As described above, the message queue 21 is a FIFO system. Thus, the message is stored in the message queue 21 following the last transmitted message. For example, in the example of FIG. 3A, the transmitted message is stored in a position "1" of the message queue 21.

In step S3, the first processor 3 increments the first head pointer H1 stored in the first memory 4. The message transmitted to the message queue 21 is stored in the position indicated by the first head pointer H1. Since this position is not a vacant position, the first processor 3 increments the first head pointer H1.

In step S4, the first processor 3 copies the updated value of the first head pointer to the second tail pointer stored in the second memory 7. Thereafter, the process of FIG. 2 ends. As the message is newly stored, the tail position of the messages changes to the position of the updated first head pointer H1. Therefore, the first processor 3 copies the value of the first head pointer H1 to the second tail pointer T2.

Figure 4:
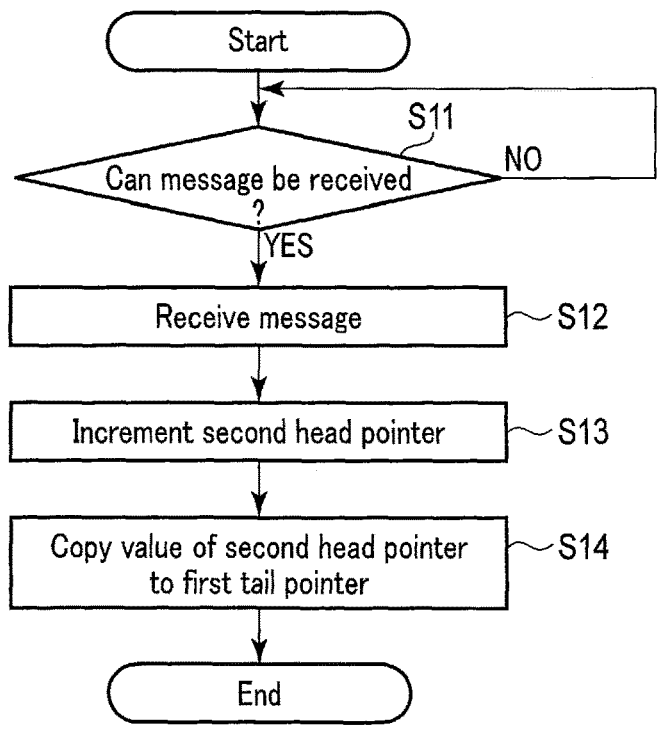
FIG. 4 is a flowchart showing a message receiving operation by a processor on the receiving side in a multiprocessor system according to an embodiment.

Next, the operation by a processor on the receiving side will be described. FIG. 4 is a flowchart showing a message receiving operation by a processor on the message receiving side in a multiprocessor system of an embodiment. In the example of FIG. 1, the processor on the receiving side is the second processor 6.

Figure 5A:
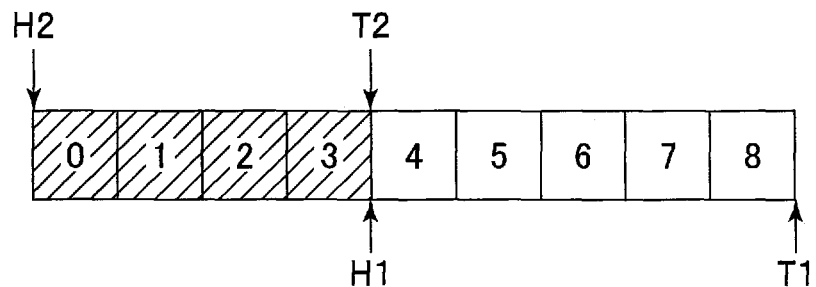
FIG. 5A is a view showing relationships between a first head pointer, a first tail pointer, a second head pointer, and a second tail pointer when a message queue is not empty.
Figure 5B:
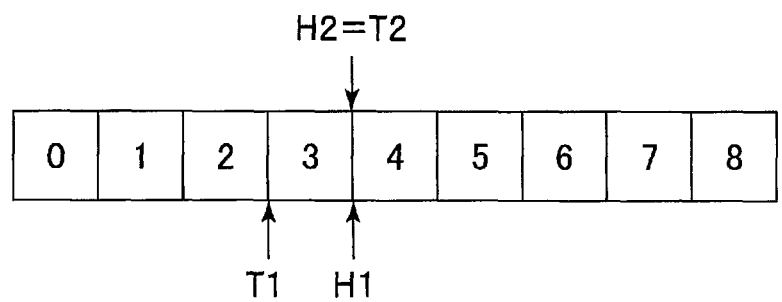
FIG. 5B is a view showing relationships between a first head pointer, a first tail pointer, a second head pointer, and a second tail pointer when a message queue is empty.

To receive a message, the second processor 6 determines, in step S11, whether or not a message can be received. The determination in step S11 is made according to whether or not the message queue 21 is empty. If the message queue 21 is empty, it is determined that the message cannot be received. When it is determined in step S11 that the message cannot be received (NO in S11), the determination in step S11 is continued. In other words, the process is held until it has been determined that the message can be received. Other processes in combination with the determination in step S11 may be performed. If it is determined in step S11 that the message can be received (YES in S11), the process proceeds to step S12. Here, whether or not the message queue 21 is empty is determined using the second pointer 71a. FIG. 5A is a view showing the relationships between the first head pointer H1, the first tail pointer T1, the second head pointer H2, and the second tail pointer T2 when the message queue 21 is not empty. Further, FIG. 5B is a view showing the relationships between the first head pointer H1, the first tail pointer T1, the second head pointer H2, and the second tail pointer T2 when the message queue 21 is empty. Here, it is assumed that messages are stored in the cross-hatched positions in FIGS. 5A and 5B.

As described above, the second head pointer H2 indicates the head position of the messages. The second tail pointer T2 indicates the tail position of the messages. In other words, the difference between the second head pointer H2 and the second tail pointer T2 indicates the width of the messages. Therefore, as shown in FIG. 5A, when messages are stored in the message queue 21, the second head pointer H2 does not coincide with the second tail pointer T2. On the other hand, as shown in FIG. 5B, when the message queue 21 is empty, the second head pointer H2 coincides with the second tail pointer T2.

In other words, in step S11, the second processor 6 determines whether or not a message can be received by determining whether or not the second head pointer H2 and the second tail pointer T2 coincide with each other.

In step S12, the second processor 6 receives messages from the message queue 21 of the shared memory 2. As described above, the message queue 21 is a FIFO system. Thus, the messages are received in the order in which they were stored. For example, in the example of FIG. 5A, the messages are transmitted to the second processor 6 from a position "0" of the message queue 21.

In step S13, the second processor 6 increments the second head pointer H2 stored in the second memory 41. When a message is received from the message queue 21, the position in which the message was stored until then becomes a vacant position. Since this position is not the position of the message, the second processor 6 increments the second head pointer H2.

In step S14, the second processor 6 copies the updated value of the second head pointer to the first tail pointer stored in the first memory 31. Thereafter, the process of FIG. 4 ends. When the message disappears, the tail position of the vacant position changes to the position of the updated second head pointer H2. Then, the second processor 6 copies the value of the second head pointer H2 to the first tail pointer T1.

As described in the embodiments above, the pointer for managing the vacancy status of the message queue is divided into a pointer for transmitting messages and a pointer for receiving messages. Thereby, the detection of whether the head pointer coincides with the tail pointer can be used for both determining whether or not to transmit a message and determining whether or not to receive a message. In other words, in an embodiment, a pointer size comparison is neither necessary for determining whether or not a message can be transmitted nor determining whether or not a message can be received. Also, when a ring buffer is used for the message queue, the pointer size comparison may not be possible unless a wrap-around process is performed depending on the tail position of the messages. In an embodiment, the wrap-around process is neither necessary for determining whether or not a message can be transmitted nor determining whether or not a message can be received. In this manner, the configuration for determining whether or not a message can be transmitted or received can be simplified. As a result, the scale of the multiprocessor system as a circuit can be reduced.

Also, in an embodiment, the reading of the pointer is performed when reading the pointer from the local memory for coincidence determination. In other words, in an embodiment, the pointer does not have to be read from a non-local memory for coincidence determination. This way, the latency for reading can be suppressed.

In the embodiments above, it has been assumed that both the determination of whether or not a message can be transmitted and the determination of whether or not a message can be received are performed by processors. However, the determinations are not limited to this. In an embodiment, the determination of whether or not a message can be transmitted and the determination of whether or not a message can be received are both identical to the detection of whether or not the pointers coincide. This coincidence detection can be performed using a circuit such as, for example, a comparator.

Also, in the embodiments above, the first processor 3 has been a processor on the transmitting side while the second processor 6 has been a processor on the receiving side. However, the processors are not limited to this.

The second processor 6 may be a processor on the transmitting side while the first processor 3 may be a processor on the receiving side.

While certain embodiments have been described, these embodiments have been presented by way of example only, and are not intended to be limited to the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multiprocessor system comprising:
a shared memory including a shared queue configured to store messages;
a first processor configured to transmit the messages to the shared queue in the shared memory;
a second processor configured to receive the messages stored in the shared queue in the shared memory;
a first memory configured to store a first head pointer and a first tail pointer, the first head pointer indicating a position of a head of a vacancy of contiguous vacant entries in the shared queue, and the first tail pointer indicating a position of a tail of the vacancy of the contiguous vacant entries in the shared queue; and
a second memory configured to store a second head pointer and a second tail pointer, the second head pointer indicating a position of a head of the messages in the contiguous entries of messages stored in the shared queue, and the second tail pointer indicating a tail position of the messages in the contiguous entries of messages stored in the shared queue,
wherein the first processor is configured to increment the first head pointer for the shared queue and copy a position identical to a position of the first head pointer to the second tail pointer for the shared queue, when transmitting the messages to the shared queue.

2. The multiprocessor system according to claim 1, wherein the first processor determines that the shared queue is full, when the position of the first head pointer and the position of the first tail pointer are identical.

3. The multiprocessor system according to claim 2, wherein the first processor does not transmit the message when the shared queue is full.

4. The multiprocessor system according to claim 1, wherein the second processor increments the second head pointer and copies a position identical to a position of the second head pointer to the first tail pointer, when receiving the messages.

5. The multiprocessor system according to claim 4, wherein the second processor determines that the shared queue is empty, when the position of the second head pointer and the position of the second tail pointer are identical.

6. The multiprocessor system according to claim 5, wherein the second processor does not receive the message when the shared queue is empty.

7. The multiprocessor system according to claim 1, wherein
the shared memory is a global memory for the first processor and the second processor,
the first memory is a local memory for the first processor, and
the second memory is a local memory for the second processor.

8. A device comprising:
a processor configured to increment a first head pointer in a first memory and copy a position identical to a position of the first head pointer to a second tail pointer in a second memory, when transmitting messages to a shared queue in a shared memory, the first head pointer indicating a position of a head of a vacancy of contiguous vacant entries in the shared queue included in the shared memory, and the second tail pointer indicating a tail position of the messages in the contiguous entries of messages stored in the shared queue.

9. The device according to claim 8, wherein the processor determines that the shared queue is full, when the position of the first head pointer and a position of a first tail pointer are identical, the first tail pointer indicating a position of a tail of the vacancy of the shared queue.

10. The device according to claim 9, wherein the processor does not transmit the message when the shared queue is full.

11. A method for controlling shared memory in a multiprocessor system comprising: a shared memory that includes a shared queue configured to store messages, a first processor transmitting the messages to the shared queue in the shared memory, and a second processor receiving the messages stored in the shared queue in the shared memory, the method comprising:
when transmitting the messages from first processor to the shared queue, incrementing, by the first processor, a first head pointer indicating a position of a head of a vacancy of contiguous vacant entries in the shared queue, and copying, to a second tail pointer indicating a tail position of the messages in the contiguous entries of messages stored in the shared queue, a position identical to a position of the first head pointer.

12. The method for controlling shared memory according to claim 11, further comprising determining, by the first processor, when the position of the first head pointer and the position of the first tail pointer are identical, that the shared queue is full.

13. The method for controlling shared memory according to claim 12, further comprising determining, by the first processor, when the shared queue is full, that the first processor does not transmit the messages.

14. The method for controlling shared memory according to claim 11, further comprising:
when receiving the messages, incrementing, by the second processor, a second head pointer indicating a head position of the messages stored in the shared queue, and copying, to a first tail pointer indicating a position of a tail of the vacancy in the shared queue, a position identical to a position of the second head pointer.

15. The method for controlling shared memory according to claim 14, further comprising determining, by the second processor, when the position of the second head pointer and the position of the second tail pointer are identical, that the shared queue is empty.

16. The method for controlling shared memory according to claim 15, further comprising determining, by the second processor, when the shared queue is empty, that the second processor does not receive the messages.

* * * * *